US010585748B2

(12) United States Patent
Baptist et al.

(10) Patent No.: US 10,585,748 B2
(45) Date of Patent: Mar. 10, 2020

(54) SCALABLE CLOUD—ASSIGNING SCORES TO REQUESTERS AND TREATING REQUESTS DIFFERENTLY BASED ON THOSE SCORES

(71) Applicant: International Business Machines Corporation, Armonk, NY (US)

(72) Inventors: Andrew D. Baptist, Mt. Pleasant, WI (US); Bart R. Cilfone, Chicago, IL (US); Greg R. Dhuse, Chicago, IL (US); Harsha Hegde, Hawthorn Woods, IL (US); Wesley B. Leggette, Chicago, IL (US); Manish Motwani, Chicago, IL (US); Jason K. Resch, Chicago, IL (US); Ilya Volvovski, Chicago, IL (US); Ethan S. Wozniak, Park Ridge, IL (US)

(73) Assignee: International Business Machines Corporation, Armonk, NY (US)

( * ) Notice: Subject to any disclaimer, the term of this patent is extended or adjusted under 35 U.S.C. 154(b) by 64 days.

(21) Appl. No.: 15/720,365

(22) Filed: Sep. 29, 2017

(65) Prior Publication Data

US 2019/0102252 A1 Apr. 4, 2019

(51) Int. Cl.
*G11C 29/00* (2006.01)
*G06F 11/10* (2006.01)
(Continued)

(52) U.S. Cl.
CPC .......... *G06F 11/1076* (2013.01); *G06F 3/065* (2013.01); *G06F 3/067* (2013.01);
(Continued)

(58) Field of Classification Search
CPC .. G06F 11/1076; G06F 16/9017; G06F 16/10; G06F 2211/104; G06F 2211/1007; H04L 29/12009; H04L 67/1012
See application file for complete search history.

(56) References Cited

U.S. PATENT DOCUMENTS 4,092,732 A    5/1978  Ouchi
5,454,101 A    9/1995  Mackay et al.
(Continued)

OTHER PUBLICATIONS

Shamir; How to Share a Secret; Communications of the ACM; vol. 22, No. 11; Nov. 1979; pp. 612-613.
(Continued)

*Primary Examiner* — Samir W Rizk
(74) *Attorney, Agent, or Firm* — Garlick & Markison; Timothy W. Markison; Timothy D. Taylor

(57) ABSTRACT

A method begins by a computing device of a dispersed storage network (DSN) maintaining a queue of pending requests to access the DSN while new requests are added to the queue and executed requests are deleted from the queue. The method continues by the computing device determining, for each pending request in the queue, a prioritization score to produce a plurality of prioritization scores. The prioritization score is determined by determining an identity of a requestor associated with a pending request, obtaining a trust score based on the requestor's identity, and obtaining a compliance score based on the requestor's identity. The trust score indicates the requestor's level of legitimate use of the DSN and the compliance score indicates the requestor's level of compliance with DSN system requests. The method continues by the computing device executing pending requests of the queue in accordance with the plurality of prioritization scores.

18 Claims, 6 Drawing Sheets

(51) Int. Cl.
  *H04L 29/12* (2006.01)
  *H04L 29/08* (2006.01)
  *G06F 16/901* (2019.01)
  *H04L 29/06* (2006.01)
  *G06F 3/06* (2006.01)
  *G06F 16/10* (2019.01)

(52) U.S. Cl.
  CPC ........ *G06F 3/0619* (2013.01); *G06F 16/9017* (2019.01); *H04L 29/12009* (2013.01); *H04L 63/102* (2013.01); *H04L 67/1012* (2013.01); *H04L 67/1097* (2013.01); *G06F 16/10* (2019.01); *G06F 2211/104* (2013.01); *G06F 2211/1007* (2013.01)

(56) References Cited

U.S. PATENT DOCUMENTS

| | | | |
|---|---|---|---|
| 5,485,474 | A | 1/1996 | Rabin |
| 5,774,643 | A | 6/1998 | Lubbers et al. |
| 5,802,364 | A | 9/1998 | Senator et al. |
| 5,809,285 | A | 9/1998 | Hilland |
| 5,890,156 | A | 3/1999 | Rekieta et al. |
| 5,987,622 | A | 11/1999 | Lo Verso et al. |
| 5,991,414 | A | 11/1999 | Garay et al. |
| 6,012,159 | A | 1/2000 | Fischer et al. |
| 6,058,454 | A | 5/2000 | Gerlach et al. |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,636,724 | B2 | 12/2009 | de la Torre et al. |
| 8,065,233 | B2 * | 11/2011 | Lee ................ G06Q 20/04 705/36 R |
| 8,977,755 | B2 | 3/2015 | Luna |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma et al. |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula, Jr. |
| 2005/0132070 | A1 | 6/2005 | Redlich et al. |
| 2005/0144382 | A1 | 6/2005 | Schmisseur |
| 2005/0229069 | A1 | 10/2005 | Hassner |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll, Jr. |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters, III et al. |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |
| 2012/0110651 | A1 | 5/2012 | Van Biljon |
| 2015/0067164 | A1 | 3/2015 | Kazi |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

(56) References Cited

OTHER PUBLICATIONS

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner

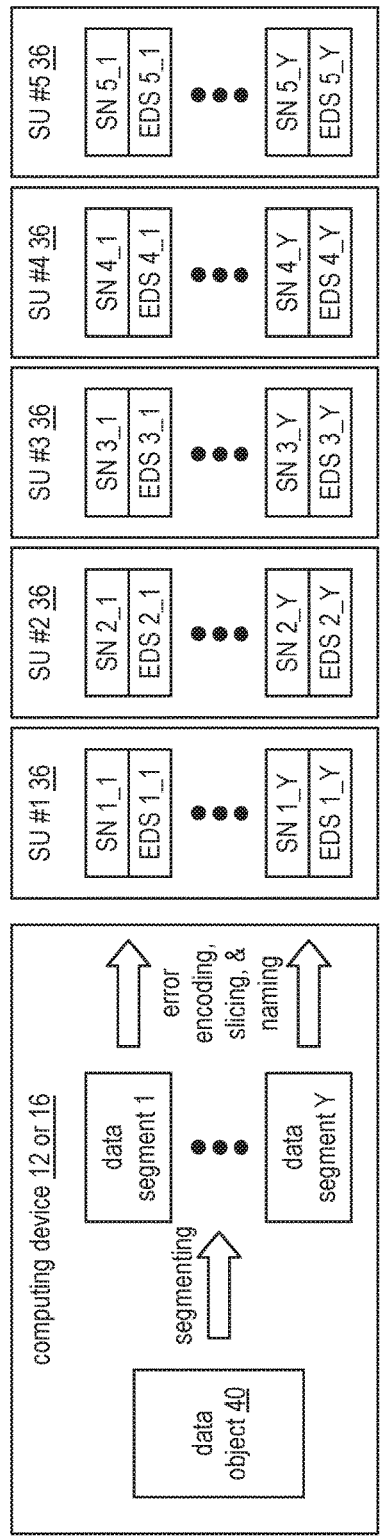
FIG. 3
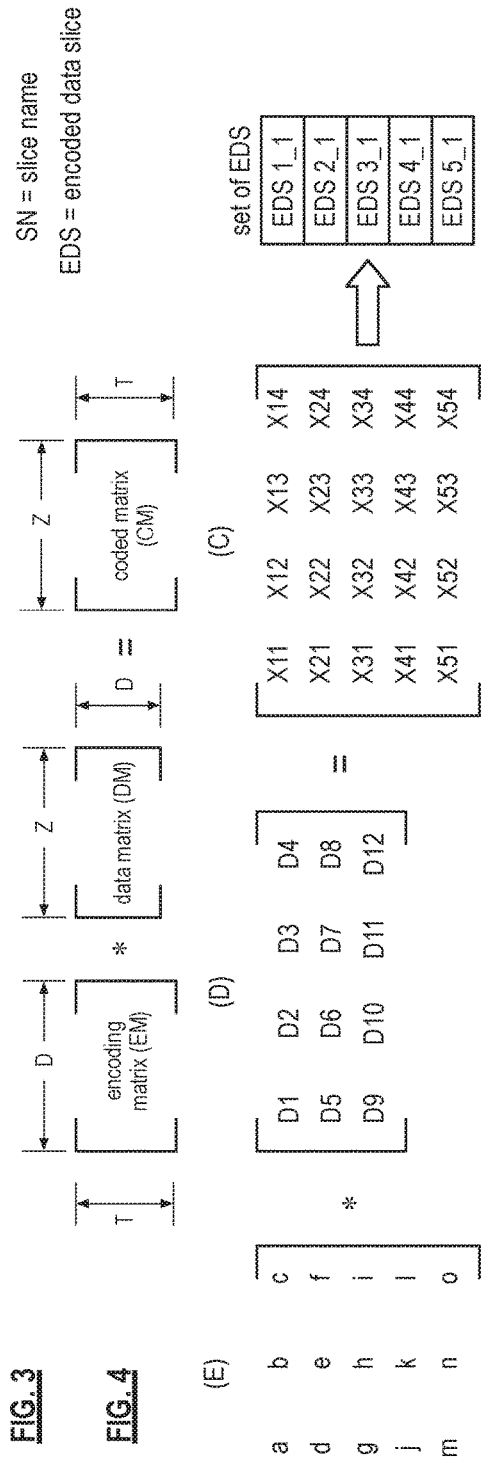
FIG. 4
FIG. 5
| pillar # | data segment # | data object ID | vault ID | data object ID | rev. info |
slice name 80
FIG. 6

SCALABLE CLOUD—ASSIGNING SCORES TO REQUESTERS AND TREATING REQUESTS DIFFERENTLY BASED ON THOSE SCORES

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

Some systems use quality of service (QoS) options to differentiate users and to treat respective requests from the different users differently based on a type of service associated with the user. For example, when a user has purchased a premium service, the system provides a premium level of performance (e.g., faster data throughput) to process the request.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

DETAILED DESCRIPTION OF THE INVENTION

Figure 1:
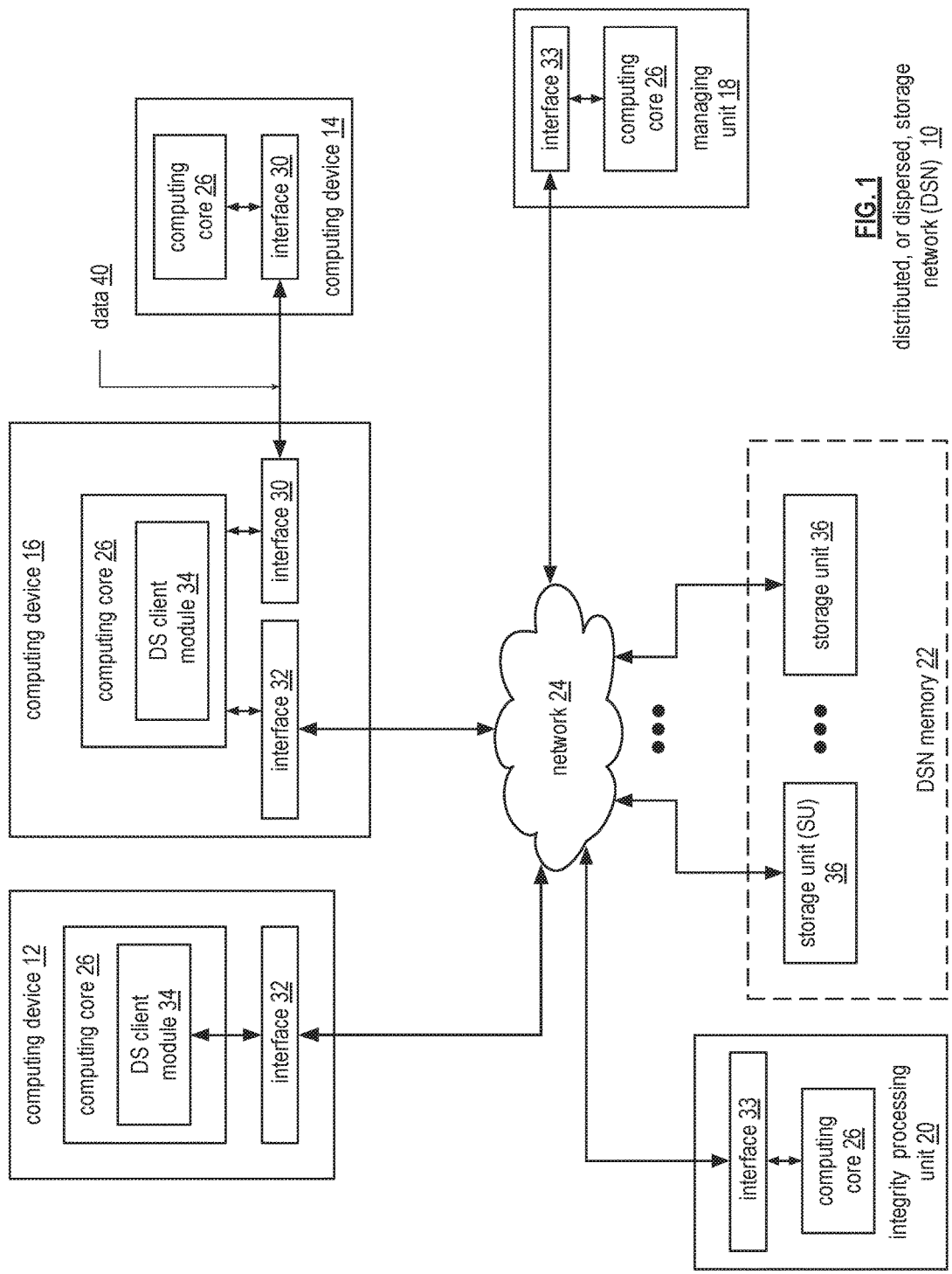
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
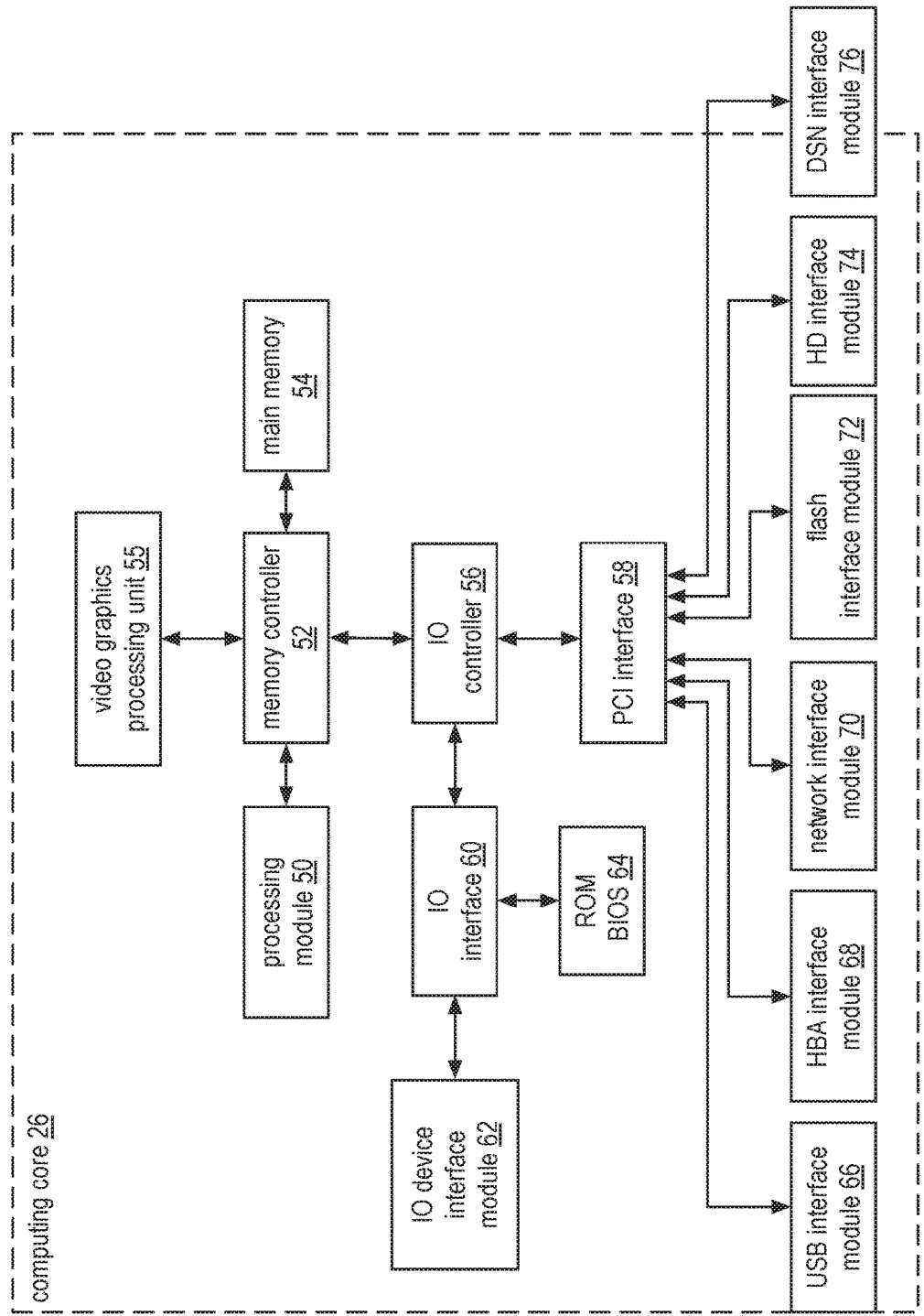
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data 40 on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (TO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76. The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
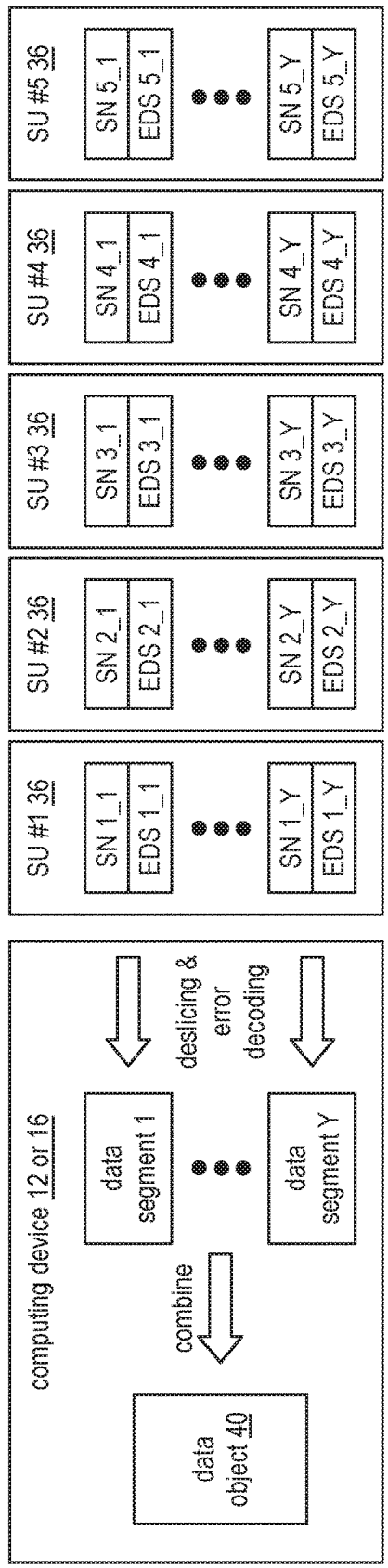
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
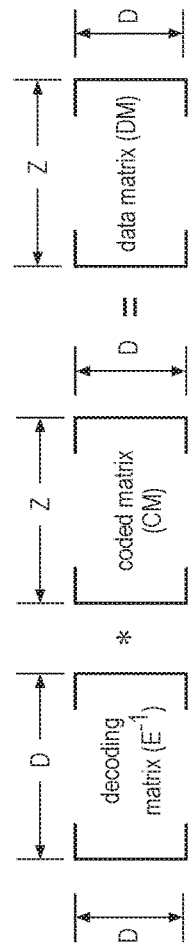
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9A:
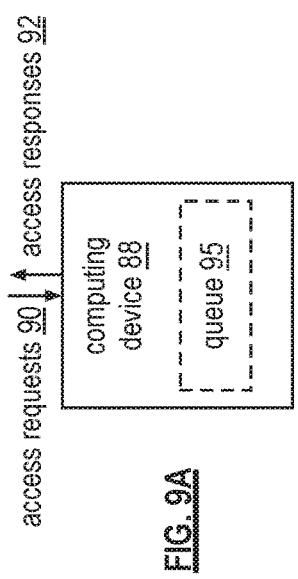
FIG. 9A is a schematic block diagram of an embodiment of a computing device in accordance with the present invention.

FIG. 9A is a schematic block diagram of a computing device 88 of a dispersed storage network (DSN). The computing device includes a queue 95 and may function as one of the computing devices 12-16, the managing unit 18 and the integrity processing unit 20 of FIG. 1. In an example of operation, the computing device 88 receives access requests 90 (e.g., write requests, read requests, list requests, etc.) from requesting entities (e.g., user device, anonymous device, etc.) with access to the DSN. After receiving and before executing the access requests, the computing device adds the access requests into a queue 95. Upon executing a pending request, the computing device sends an access response 92 to one or more of the requesting entities and other computing devices within the DSN.

Figure 9B:
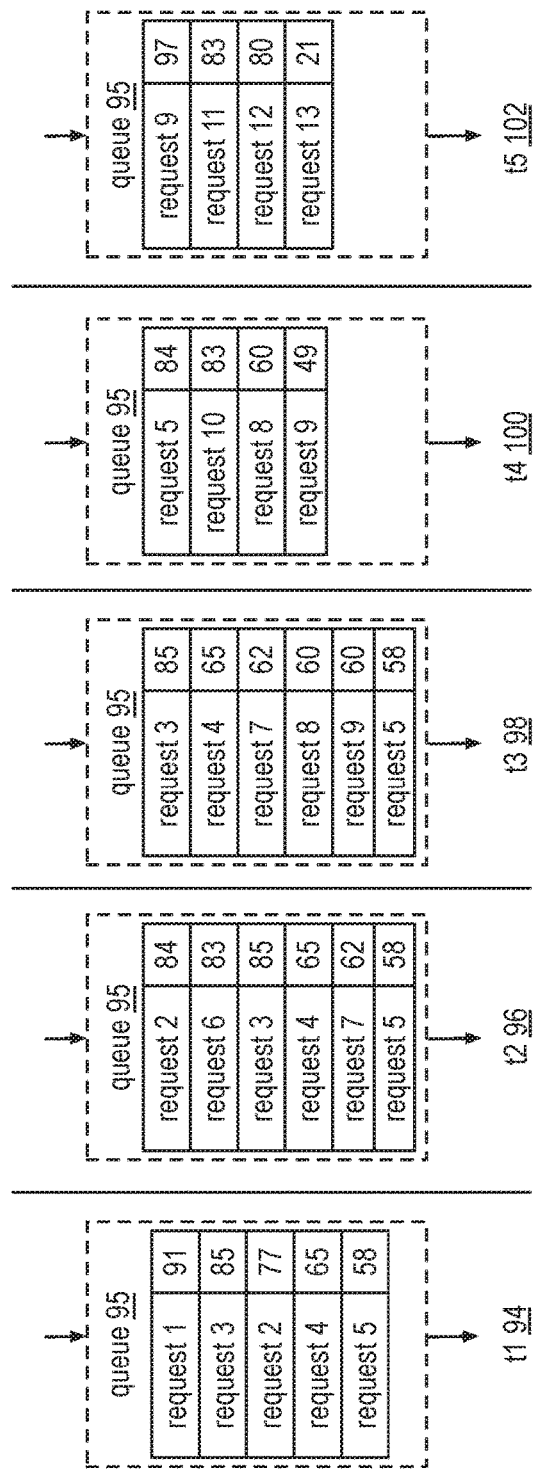
FIG. 9B is a schematic block diagram of an example of processing requests in a queue in accordance with the present invention.

FIG. 9B is a schematic block diagram of the queue 95 of computing device 88 during different time periods t1-t5 94-102. At each time t1-t5 94-102 the queue 95 includes a list of pending requests. For example, at time t1, the queue includes pending requests 1-5, at time t2, the queue includes pending requests 2-7, at time t3 98, the queue includes pending requests 3-5 and 7-9, etc. When the computing device receives new requests, the new requests are added to the queue, and as the computing device executes requests, the executed requests are removed from the queue.

For each request, the computing device determines the identity of the requesting entity. For example, the computing device determines the identity based on the requester being associated with an authenticated identity. As another example, the computing device determines the identity based on networking information (e.g., for an anonymous user). For each request, the computing device also obtains a prioritization score associated with each request. For example, the computing device obtains a default prioritization score for a new authenticated user. As another example, the computing device retrieves a saved scored from memory of the DSN for a known authenticated user. As a further example, the computing device generates a default score based on the method of authentication of an anonymous user (e.g., Turning challenge, network address, cookies, automatically generated unique identification, etc.). The prioritization score is based on one or more of a trust score, a compliance score, a billing score and a level of use score. The determination of when the prioritization score may be performed may be based on one or more of: receiving a new request, when receiving greater than a threshold number of requests in a timeframe, after the duration of a timeframe (e.g., every 50 milliseconds, every 1 second, etc.) and receiving a command.

The trust score indicates the requestor' s level of legitimate use of the DSN. For example, a request for storing a set of encoded data slices may have a higher trust score than a request for storing a data object. As another example, a requester with a past history of 50 transactions over a 4-week period may have a higher trust score than a requester with a past history of 4 transactions over a 4-week period. As a further example, a first requester associated with a user account may have a higher trust score than a second requestor associated with an anonymous user. As a yet further example, a first requester associated with an anonymous user tracked by cookies may have a higher trust score than a second requestor associated with an anonymous user not tracked by cookies.

The compliance score indicates the requester's level of compliance with DSN system requests. For example, a requester that appropriately backs off (e.g., by delaying a future request, by cancelling excess encoded data slice requests (e.g., requests greater than a write threshold, requests greater than a read threshold, etc.), etc.) when informed a computing device with which it is interacting is under high load may have its compliance score increased. As another example, a first requester that throttles back (e.g., accepts a lower bitrate, delays a subsequent request, etc.) its requests when requested to do so by the computing device may have higher compliance score than a second requester that does throttle back its requests. As a yet further example, a first requester that has a past history of a 96% compliance rate may have a higher compliance score than a second user who has a past history of a 92% compliance rate.

The billing score indicates the requestor's level of bill payment compliance. For example, a requester who has a past history of on-time bill payment may have its billing score increased. As another example, a first requester who has an outstanding balance of five hundred dollars, may have a higher billing score than a second requester who has an outstanding balance of two hundred and twenty dollars. As yet another example, a first requester who has a past history of 70 consecutive transactions of on-time payments may have a higher billing score than a second requester who has a past history of 55 consecutive transactions of on-time payments. As still yet a further example, a first requester that is associated with a pre-paid account may have a higher biller score than a second requester that is associated with a "pay as you go" account.

The level of use score indicates the requestor's volume of requests, thrashing of data, and repeating of requests. As an example, a requester that floods the DSN memory with requests (e.g., sends greater than a threshold number of requests in a given timeframe) may have its level of use score decreased. As another example, a requester that sends mostly low-priority requests may have its level of use score increased. As yet another example, a requester that consistently requests to write/read a pillar width number of encoded data slices may have its level of use score decreased. As yet a further example, a requester that consistently requests to write/read more than a certain percentage (e.g., 10%, 15%, 40%, etc.) greater than the write/read threshold number of encoded data slices may have its level of use score decreased. As yet still a further example, a requester that writes and deletes a substantially similar set of encoded data slices or data object within a short timeframe (e.g., 5 min, 2 days, a timeframe threshold relative to size of data, etc.) may have its level of use score decreased. As yet still another further example, a requester that generates high traffic (e.g., a large number of requests) may have its level of use score decreased. As yet still another further example, a requester that has not had its request processed within a threshold timeframe (e.g., due to other requesters requests having a higher prioritization score), may have its level of use score increased.

The scores (e.g., trust, compliance, billing and level of use) may be obtained (e.g., received, generated, etc.) by determining whether a requestor's pending request is a first request to the DSN. When the pending request is the first request, the computing device utilizes a default score for one or more of the trust, compliance, billing and level of use scores. When the pending request is not the first request, the computing device retrieves the requestor's one or more scores from memory of the DSN. Note the one or more of the trust, compliance, billing and level of use scores may be weighted, averaged, summed, etc. for calculating the prioritization score. Further note, one or more of the trust, compliance, billing and level of use scores may be used as the prioritization score. Still further note, the scores may be further modified the computing device when in the queue based on a determination by the computing device. For example, when a requestor has two pending requests in queue 95, the computing device may modify (e.g., increase, decrease) scores for one or both of the requests (e.g., when one request is a higher priority, when one request is of significantly smaller size, when one request is for a rebuilt encoded data slice, etc.). As another example, the computing device may weight one of the scores based on the type of data requested (e.g., higher score when the request is for a more secure form of data (e.g., encrypted and encoded data slices, etc.)).

In an example of operation, before the first time t1 94, the computing device receives requests 1-5 from requesters operating in the DSN. At the first-time period t1 94, none of the requests have yet been processed, thus the queue 95 includes requests 1-5. As illustrated, the requests are listed in order of the prioritization score. For example, request 1 has a prioritization score of 91 and will be executed first, request 3 has a prioritization score of 85 and will be executed second, request 2 has a prioritization score of 77 and will be executed third, request 4 has a prioritization score of 65 and will be executed fourth and request 5 has a prioritization score of 58 and will be executed fifth. During time period t1 94, the computing device 88 processes request 1, deletes request 1 from the queue, and receives request 6 and request 7 and obtains respective prioritization scores (e.g., 83 for request 6 and 62 for request 7).

At time period t2 96, the queue 95 now includes, in order of prioritization score, request 2, request 6, request 3, request 4, request 7, and request 5. Note the computing device may re-obtain the prioritization score for one or more requests (e.g., request 2 score increasing from 77 in time t1 to 84 in time t2). Also note the computing device may re-obtain the prioritization score for a request based on one of when determining a prioritization score for a new pending request, after a timeframe, after a certain number of new requests, and a command. For example, a requesters prioritization score is re-obtained upon receiving a command message indicating a user associated with the requester upgraded its service level in the DSN.

Having determined the prioritization score for each pending request, the computing device then alters the processing of the request based on each respective prioritization score. For example, at time t1, request 2 ranked lower than request 3, but at time t2, request 2 ranks higher than request 3, and will be processed accordingly unless the computing device re-obtains the prioritization scores. During time t2 96, the computing device executes requests 2 and 6, deletes requests 2 and 6 from the queue, receives requests 8 and 9 and obtains prioritization scores for requests 8 and 9.

At time t3 98, the queue 95 now includes request 3 with an associated prioritization score of 85, request 4 with an associated prioritization score of 65, request 7 with an associated prioritization score of 62, request 8 with an associated prioritization score of 60, request 9 with an associated prioritization score of 60, and request 5 with an associated prioritization score of 58. Note requests 8 and 9 have the same prioritization score (e.g., being from the same requester, both requesters are anonymous users, etc.) and as such, may be processed by one of in the order they were received, by a service level associated with each requester (e.g., when the tie is not from being from the same requester), by the size of the request, and a command. During time t3 98, the computing device 88 executes requests 3, 4 and 7, deletes requests 3, 4 and 7 from the queue, receives request 10 and obtains a prioritization score for request 10.

At time t4 100, the queue now includes request 5 with an associated prioritization score of 84, request 10 with an associated prioritization score of 83, request 8 with an associated prioritization score of 60, and request 9 with an associated prioritization score of 59. In this example, request 5 had its prioritization score increase from 58 in times t1, t2, and t3, to 84 in time t4. This increase resulted from a level of use score increasing due to exceeding a threshold number of other requests (e.g., 3) being executing that were received after receiving request 5. Request 8 and 9 are from the same requestor and initially received the same score. However, the prioritization score for request 9 was decreased from 60 to 49 as it was a lower priority request and larger in size than request 8. During time t4 100, the computing device executes requests 5, 10, and 8, deletes requests 5, 10 and 8 from the queue, receives requests 11, 12 and 13 and obtains prioritization scores for requests 11, 12 and 13. At time t5 102, the queue now includes requests 9, 11, 12 and 13 in order of prioritization score.

Figure 10:
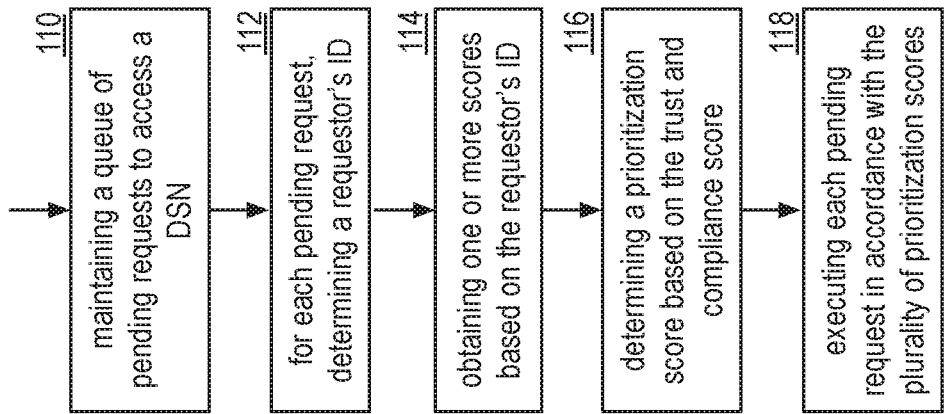
FIG. 10 is a logic diagram of an example of a method of processing requests in accordance with a scoring system in accordance with the present invention.

FIG. 10 is a logic flow diagram of a method of processing requests in accordance with a scoring system. The method begins at step 110, where a computing device of a dispersed storage network (DSN) maintains a queue of pending requests to access the DSN. Each of the new requests are added to the queue and after execution of a request, the executed request is deleted from the queue. The method continues at step 112, where the computing device determines a requestor's identity associated with each pending request. For example, the computing device determines the requestor is a registered user device based on a registered user identifier. As another example, the computing device determines the requestor is an anonymous user device based on one or more of a generated unique identifier, a cookie, a network address, a session identifier, and an anonymous authentication.

The method continues with step 114, where the computing device obtains one or more of a trust score, a compliance score, a billing score, and a level of use score based on the requestor's identity. The scores (e.g., trust, compliance, billing and level of use) may be obtained (e.g., received, generated, etc.) by determining whether a requestor's pending request is a first request to the DSN. When the pending request is the first request, the computing device utilizes a default score for one or more of the trust, compliance, billing and level of use scores. When the pending request is not the first request, then the computing device retrieves the requestor's current scores. Note the default scores may have variances, such as an anonymous user's default trust score being lower than a register user's default trust score.

The method continues with step 116, where the computing device determines a prioritization score of a plurality of prioritization scores based on one or more of the trust score, the compliance score, the billing score, and the level of use score. The method continues with step 118, where the computing device executes the pending requests of the queue in accordance with the plurality of prioritization scores. For example, the computing device may execute the pending request by performing one or more of rejecting the pending request as a not allowed error, rejecting the pending request as a payment required error, and rejecting the pending request as a system busy error. As another example, the computing device may execute the pending request by performing one or more of throttling the rate of processing the pending request, delaying processing of the pending request, routing the pending request to another computing device of the DSN, processing the pending request and accelerated processing of the pending request. After executing the requests, the computing device saves (e.g., updates, creates) the requesters scores and sends the scores to DSN memory (e.g., in per-account metadata).

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:
    maintaining, by a computing device of a dispersed storage network (DSN), a queue of pending requests to access the DSN, wherein new requests are added to the queue and executed requests are deleted from the queue;
    for each pending request in the queue, determining, by the computing device, a prioritization score to produce a plurality of prioritization scores, wherein the prioritization score is determined by:
        determining a requestor's identity of a requestor associated with a pending request of the pending requests;
        obtaining a trust score based on the requestor's identity, wherein the trust score indicates the requestor's level of legitimate use of the DSN;
        obtaining a compliance score based on the requestor's identity, wherein the compliance score indicates the requestor's level of compliance with DSN system requests; and
        generating the prioritization score based on the trust score and the compliance score; and
    executing, by the computing device, the pending requests of the queue in accordance with the plurality of prioritization scores.

2. The method of claim 1, wherein the determining the prioritization score further comprises:
    obtaining a billing score based on the requestor's identity, wherein the billing score indicates the requestor's level of bill payment compliance; and
    generating the prioritization score based on the trust score, the compliance score, and the billing score.

3. The method of claim 1, wherein the determining a requestor's identity further comprises:
    determining the requestor is a registered user device based on a registered user identifier; and
    determining the requestor is an anonymous user device based on one or more of a generated unique identifier, a cookie, a network address, a session identifier, and an anonymous authentication.

4. The method of claim 1, wherein the obtaining the trust score comprises:
    determining whether the pending request of the requestor is a first request to the DSN;
    when the pending request of the requestor is the first request to the DSN, utilizing a default trust score as the trust score; and
    when the pending request of the requestor is not the first request to the DSN, retrieving the trust score for the requestor.

5. The method of claim 1, wherein the obtaining the compliance score comprises:
    determining whether the pending request of the requestor is a first request to the DSN;
    when the pending request of the requestor is the first request to the DSN, utilizing a default compliance score as the compliance score; and
    when the pending request of the requestor is not the first request to the DSN, retrieving the compliance score for the requestor.

6. The method of claim 1 further comprises:
    after execution of the pending request, updating the compliance score based on the computer device and requestor system level interaction.

7. The method of claim 1 further comprises:
    after execution of the pending request, updating the trust score based on the computer device processing of the pending request.

8. The method of claim 1, wherein executing the pending request comprises one of:
    rejecting the pending request as a not allowed error;
    rejecting the pending request as a payment required error;
    rejecting the pending request as a system busy error;
    throttling rate of processing the pending request;
    delaying processing of the pending request;
    routing the pending request to another computing device of the DSN;
    processing the pending request; and
    accelerated processing of the pending request.

9. The method of claim 1, wherein the determining the prioritization score further comprises:
    obtaining a level of use score based on the requestor's identity, wherein the level of use score indicates the requestor's volume of requests, thrashing of data, and repeating of requests; and
    generating the prioritization score based on the trust score, the compliance score, and the level of use score.

10. A computing device comprises:
    an interface;
    memory; and
    a processing module, wherein the processing module is operable coupled to the memory and the interface, and wherein the processing module is operable to:
    maintain a queue of pending requests to access a dispersed storage network (DSN), wherein new requests are added to the queue and executed requests are deleted from the queue;
    for each pending request in the queue, determine a prioritization score to produce a plurality of prioritization scores, wherein the prioritization score is determined by:

determining a requestor's identity of a requestor associated with a pending request of the pending requests;

obtaining a trust score based on the requestor's identity, wherein the trust score indicates the requestor's level of legitimate use of the DSN;

obtaining a compliance score based on the requestor's identity, wherein the compliance score indicates the requestor's level of compliance with DSN system requests; and generating the prioritization score based on the trust score and the compliance score; and execute the pending requests of the queue in accordance with the plurality of prioritization scores.

11. The computing device of claim 10, wherein the processing module is further operable to determine the prioritization score by:

obtaining a billing score based on the requestor's identity, wherein the billing score indicates the requestor's level of bill payment compliance; and generating the prioritization score based on the trust score, the compliance score, and the billing score.

12. The computing device of claim 10, wherein the processing module is further operable to determine a requestor's identity further by:

determining the requestor is a registered user device based on a registered user identifier; and determining the requestor is an anonymous user device based on one or more of a generated unique identifier, a cookie, a network address, a session identifier, and an anonymous authentication.

13. The computing device of claim 10, wherein the processing module is further operable to obtain the trust score by:

determining whether the pending request of the requestor is a first request to the DSN;

when the pending request of the requestor is the first request to the DSN, utilizing a default trust score as the trust score; and when the pending request of the requestor is not the first request to the DSN, retrieving the trust score for the requestor.

14. The computing device of claim 10, wherein the processing module is further operable to obtain the compliance score by:

determining whether the pending request of the requestor is a first request to the DSN;

when the pending request of the requestor is the first request to the DSN, utilizing a default compliance score as the compliance score; and when the pending request of the requestor is not the first request to the DSN, retrieving the compliance score for the requestor.

15. The computing device of claim 10, wherein the processing module is further operable to:

after execution of the pending request, updating the compliance score based on the computer device and requestor system level interaction.

16. The computing device of claim 10, wherein the processing module is further operable to:

after execution of the pending request, updating the trust score based on the computer device processing of the pending request.

17. The computing device of claim 10, wherein the processing module is operable to execute the pending request by one of:

rejecting the pending request as a not allowed error;

rejecting the pending request as a payment required error;

rejecting the pending request as a system busy error;

throttling rate of processing the pending request;

delaying processing of the pending request;

routing the pending request to another computing device of the DSN;

processing the pending request; and accelerated processing of the pending request.

18. The computing device of claim 10, wherein the processing module is operable to determine the prioritization score by:

obtaining a level of use score based on the requestor's identity, wherein the level of use score indicates the requestor's volume of requests, thrashing of data, and repeating of requests; and generating the prioritization score based on the trust score, the compliance score, and the level of use score.

* * * * *